UNITED STATES PATENT OFFICE.

LOUIS E. BARTON, OF NIAGARA FALLS, NEW YORK, AND HENRY A. GARDNER, OF WASHINGTON, DISTRICT OF COLUMBIA, ASSIGNORS TO THE TITANIUM ALLOY MANUFACTURING COMPANY, OF NEW YORK, N. Y., A CORPORATION OF MAINE.

LAKE PIGMENT AND THE MANUFACTURE THEREOF.

1,286,916.  Specification of Letters Patent.  Patented Dec. 10, 1918.

No Drawing.  Application filed November 28, 1917. Serial No. 204,380.

*To all whom it may concern:*

Be it known that we, LOUIS E. BARTON and HENRY A. GARDNER, both citizens of the United States, and residents, respectively, of Niagara Falls, in the county of Niagara and State of New York, and Washington, in the District of Columbia, have invented certain new and useful Improvements in Lake Pigments and the Manufacture Thereof, of which the following is a specification.

Our present invention relates to that class of lakes the coloring matter of which, usually organic, is fixed upon a mineral base such as to impart the spreading capacity and body requisite for pigment purposes, and its objects comprise provision of procedures, including novel additions, whereby such lakes, or pigments, of superior quality, are more readily and economically producible industrially, and possessed of novel properties ameliorative, of the inks, paints, or other colorants containing them, as regards durability, opacity, or hiding power, brilliancy, homogeneity, etc.

We attain these objects by using in the production and formation of our novel lakes, or lake pigments, titanic oxid, or a pigment containing a substantial amount thereof. Such oxid is, among its other desirable qualities for our purposes, possessed of an exceptionally high refractive index; and, if obtained by precipitation, is unusually fine and smooth in structure. It is also highly refractory, and receptive and retentive of the coloring matters therewith incorporated by the practice of our invention as illustrated by the following example, viz:

We place in any suitable vat a quantity such as indicated, of an organic coloring matter, precipitable by barium chlorid, for example, Ponceau 3R. This we dissolve in water. We then add dry sodium sulfate and stir the mass until solution is complete. In another vat, preferably arranged below the first, we place a quantity, such as indicated by the product desired, of titanic oxid ($TiO_2$), preferably in the form of what is now known as a "composed titanic oxid pigment" consisting usually approximately of twenty parts $TiO_2$ and eighty parts $CaSO_4$. To this we add sufficient barium chlorid to precipitate, during the next step, the organic coloring matter referred to. We then slowly run the said contents of the upper into the lower vat, and in the latter agitate the charge and maintain it at the temperature indicated for the most complete reaction and precipitation. The resulting precipitate of organic matter in conjunction with the titanic oxid, the white calcium sulfate base, and also the barium sulfate that has been precipitated, will, in this instance, be a lake, available as a pigment, of a beautiful red color, the hue and tone of which, as well as certain of its physical characteristics, may be controlled, as will be apparent to those skilled in the art, by correspondingly varying the proportions of the ingredients, the strength of the solution, the temperature, the rapidity of the precipitation, etc. We then wash and dry our resulting lake, or pigment, precipitate, after which it is ready to be incorporated, at any preferred stage, and in any preferred manner, or extent, with the other usual constituents of colorant substances, such as paints, printable inks, or colors. It will be understood that we do not limit ourselves to precisely the procedure above described, the essence of our invention being to insure the presence of the titanic oxid during the substantially usual formation of the lake product.

The preparation of isolated titanic oxid preferable for our above purposes are those in which it is had in such amorphous, substantially pure, fine, smooth, powdered form as are obtainable by aid of such procedures as are described in Letters Patent granted to Auguste J. Rossi and Louis E. Barton, Nos. 1,106,406, 1,106,407, 1,106,408, 1,106,409, 1,106,410, dated August 11, 1914, No. 1,166,547 dated January 4, 1916, No. 1,171,542, dated February 15, 1916, and Nos. 1,196,029, 1,196,030, 1,196,031, dated August 29, 1916; also to Louis E. Barton No. 1,189,229, dated July 4, 1916, No. 1,201,541, dated October 16, 1917, and Nos. 1,206,796, 1,206,797, 1,206,798, dated December 5, 1916.

As to the composite titanic oxid pigments above referred to, we have also found these particularly well suited to act as a base upon which to precipitate certain reds made with beta naphthol, commonly referred to as par-anitranilin reds, toluidin reds, and the like, such composite titanic oxid pigments being exemplified by those in which the titanic oxid is in the form of very minute particles in coalesced combination with, and adherent to, particles, or "carriers" of some other substance, usually a sulfate, and preferably calcium sulfate, such, for example, as produced by precipitation of the said oxid upon such a substance while suspended in an acid solution, preferably a sulfuric acid solution, as per the procedures described in Letters Patent granted to Louis E. Barton No. 1,155,462, dated October 5, 1915, 1,205,144, dated November 21, 1916, or 1,240,405, dated September 18, 1917.

Having now described our invention, what we claim as new and desire to secure by Letters Patent is the following, viz:

1. The method of producing a lake which comprises suspending a pigment containing titanic oxid ($TiO_2$) in a liquid containing an organic coloring matter and precipitating said matter upon said pigment.

2. In the manufacture of a lake, the step which consists in adding to the solution a white base containing a substantial amount of titanic oxid ($TiO_2$).

3. The method of producing a lake pigment, which comprises dissolving coloring matter in water, suspending titanic oxid in the solution, and precipitating the coloring matter upon it.

4. The method of producing a lake pigment, which comprises dissolving an organic coloring matter in water, suspending in the solution a titanic oxid-containing pigment, and precipitating the organic coloring matter upon it.

5. A lake containing a coloring matter in conjunction with a white base containing titanic oxid.

6. A lake containing an organic coloring matter in conjunction with a white base containing titanic oxid.

7. A lake containing a coloring matter in conjunction with a white base, and a composite titanic oxid pigment, comprising a carrier material having therewith coalesced thereto adherent particles of titanic oxid.

8. A lake containing an organic coloring matter in conjunction with a white base, and a composite titanic oxid pigment, comprising a carrier material having therewith coalesced thereto adherent particles of titanic oxid.

LOUIS E. BARTON.
HENRY A. GARDNER.

Witnesses as to Louis E. Barton:
EURITH GOOLD,
MATTHEW COWDEN HAYES.
Witnesses as to Henry A. Gardner:
J. E. JIRDINSTON,
V. P. BUNS.